UNITED STATES PATENT OFFICE.

JACQUES FERDINAND GUGGENBUHL, OF PARIS, FRANCE.

SOLDER FOR ALUMINUM.

933,433.  Specification of Letters Patent.  Patented Sept. 7, 1909.

No Drawing.  Application filed June 22, 1908.  Serial No. 439,716.

*To all whom it may concern:*

Be it known that I, JACQUES FERDINAND GUGGENBUHL, of 22 Rue de Bagnoles, in the city of Paris, Republic of France, coppersmith, have invented a Solder for Aluminum, of which the following is a full, clear, and exact description.

My invention relates to a solder for aluminum.

This solder possesses exceptional advantages, it is not easily broken and it readily resists the action of acid and water. It may be used for soldering pieces of pure aluminum or of the alloys thereof, or for soldering aluminum upon copper, zinc, steel and other metals, regardless of the general shape and thickness of the parts.

This solder is peculiarly adapted for securing together aluminum parts into solid articles of the kind heretofore made only by crimping or clasping said parts together.

The solder is composed of zinc, copper and aluminum alloyed together. The proportions may be varied slightly, but I find that the following bring good results: To make one kilogram of solder I employ zinc 850 grams, red copper 107 grams, aluminum 43 grams, total 1000 grams or one kilogram. The solder therefore contains 85% of zinc, $10\frac{7}{10}\%$ of copper, and $4\frac{3}{10}\%$ of aluminum. I melt the three metals together and skim off any slags which form as soon as they are produced. The metals alloy quite readily. I then cast them into molds, preferably of suitable shape to form rods, or thin sticks, of the solder which is now ready for the market. In order to use the solder thus prepared a blow pipe, which may be of either high pressure or low pressure, is employed. The operator applies a scraper to the surfaces to be treated and preferably gives these surfaces some degree of polish by a careful use of the scraper. He then causes the soldering stick to travel over the surfaces thus prepared, and, in doing this, projects the jet of the blow pipe upon the solder. After the solder has assumed its new form and become set, the part is finished with a file, a scraper, or other suitable tools, as is usual in soldering.

Having thus described my invention, I claim as new and desire to secure by Letters Patent:

A solder for aluminum and other metals, said solder containing the following metals in the approximate proportions stated: zinc 85%, copper $10\frac{7}{10}\%$, and aluminum $4\frac{3}{10}\%$.

The foregoing specification of my "solder for aluminum" signed by me this twelfth day of June 1908.

JACQUES FERDINAND GUGGENBUHL.

Witnesses:
E. W. BARTHOLOMEW, Jr.,
MAURICE H. PIGNET.